(12) United States Patent
Woodward

(10) Patent No.: US 7,068,940 B1
(45) Date of Patent: Jun. 27, 2006

(54) SYSTEM AND METHOD FOR MONITORING AND CONTROLLING LIGHT PROPAGATION IN AN OPTICAL TRANSMISSION SYSTEM

(75) Inventor: Sheryl Leigh Woodward, Holmdel, NJ (US)

(73) Assignee: AT&T Corp., New York, NY (US)

( * ) Notice: Subject to any disclaimer, the term of this patent is extended or adjusted under 35 U.S.C. 154(b) by 588 days.

(21) Appl. No.: 10/056,386

(22) Filed: Jan. 24, 2002

(51) Int. Cl.
H04J 14/02 (2006.01)

(52) U.S. Cl. .............................. 398/95; 398/83
(58) Field of Classification Search ................. 398/83, 398/84, 85, 93, 95, 196
See application file for complete search history.

(56) References Cited

U.S. PATENT DOCUMENTS 5,926,300 A * 7/1999 Miyakawa et al. ........... 398/83

2001/0030786 A1* 10/2001 Takahashi et al. .......... 359/127
2003/0007209 A1* 1/2003 Liu et al. .................... 359/127

OTHER PUBLICATIONS

Feuer, Mark et al., "Crosstalk in a Metro-Scale Ring With Passive Optical Add/Drop," *LEOS 2000, 13th Annual Meeting*, IEEE, Nov. 13-16, 2000, pp. 694-695, vol. 2.
Dods, Sarah D. and Tucker, Rodney S., "Homodyne Crosstalk Performance of Reconfigurable Optical Add-Drop Multiplexers," *Optical Fiber Communication Conference and Exhibit, 2001,* Mar. 17-20, 2001, vol. 2, p. TuW4-1-TuW4-3, ISBN: 1-55752-655-9.

* cited by examiner

*Primary Examiner*—Christina Y. Leung

(57) ABSTRACT

According to the present invention, a system and method provides for monitoring and controlling light propagation in optical transmission systems. The system either includes an optical circulator coupled to an optical add mechanism and is used to detect light propagation, or an optical monitoring device is coupled to the optical circulator and to the optical add device via a feedback path to control light propagation.

5 Claims, 7 Drawing Sheets

SYSTEM AND METHOD FOR MONITORING AND CONTROLLING LIGHT PROPAGATION IN AN OPTICAL TRANSMISSION SYSTEM

BACKGROUND

1. Field

The present invention relates generally to optical transmission systems, and more specifically to detecting and controlling light propagation in optical transmission systems.

2. Background

Optical technology has long been used to provide point-to-point connections in high-speed communication networks. The capacity of these links has increased dramatically in recent years with the development of dense-wavelength-division-multiplexed (DWDM) systems, wherein multiple signals are transmitted simultaneously on different wavelength channels. Switching and routing have traditionally been performed by converting the optical signals to electronic signals, employing electronic switches, and then converting the signals back into the optical domain. As optical technology becomes more mature, some routing functions are starting to be performed in the optical domain. Products are available for the metropolitan market that use optical-add-drop multiplexers (OADMs) to route different wavelengths to different destinations allowing some wavelengths to bypass nodes in a DWDM network. To make a communication network more flexible, it is desirable to be able to configure dynamically the network. Tunable OADMs would allow a network operator to change which wavelengths bypass nodes and which wavelengths are dropped.

OADMs are frequently made of optical circulators and wavelength-selective devices, such as Bragg gratings. Bragg gratings act as wavelength-selective mirrors. To make a network dynamically reconfigurable, tunable components, such as tunable filters or tunable lasers, can be used. Adding and dropping a subset of the wavelengths transmitted on a fiber can create problems in the transmission if a wavelength is not entirely dropped or if the add mechanism operates less than optimally such that some portion of the energy of the added signal propagates in an undesired direction, for example. This mixing of wavelengths creates a mixing of signals called crosstalk, which is typically an undesirable phenomenon.

To combat this problem and prevent unwanted signal mixing, optical isolators can be used to isolate a drop device or mechanism from an add device or mechanism. An example configuration is depicted in FIG. 1. In this known configuration, an optical isolator 106 is placed between an optical drop mechanism 104 and an optical add mechanism 108. This configuration ideally prevents any wavelengths added by optical add mechanism 108 from propagating in a direction A towards optical drop mechanism 104, because optical isolator 106 only allows signal flow in the direction indicated by its associated arrow. Without optical isolator 106 light added at ADD mechanism 108 may mix with light dropped at DROP mechanism 104, degrading the quality of the dropped signal.

While this arrangement is effective in blocking the added wavelength energy from mixing with or affecting the drop mechanism, it does nothing to improve the effectiveness or efficiency of the add operation itself. It would be useful to have a technique that not only blocks components from propagating in an undesired direction, but also provides a measurement of the level of effectiveness of the add operation itself. That measurement might then be used in a variety of ways.

Therefore, a need exists for an improved system and method for detecting and controlling wavelength propagation within optical transmission systems.

SUMMARY

Embodiments disclosed herein address the above-stated need by providing a system and method for detecting and controlling light propagation in optical transmission systems. According to a first aspect of the present invention, an optical circulator coupled to an optical add mechanism is used to detect light propagation. According to another aspect of the present invention, an optical monitoring device is coupled to the optical circulator and to the optical add device via a feedback path. The light transmitted to the optical monitoring device can be used for a variety of purposes, including providing input to a feedback mechanism for controlling the add mechanism.

BRIEF DESCRIPTION OF THE DRAWINGS

FIG. 3b is a schematic representation of another embodiment of the optical ADD mechanism of FIG. 3a.

DETAILED DESCRIPTION

Overview

The present invention relates generally to optical transmission systems, and more specifically to detecting and controlling light propagation in optical transmission systems. According to various embodiments of the present invention, an optical circulator coupled to an optical add mechanism is used to detect light propagation along a given direction.

Figure 1:
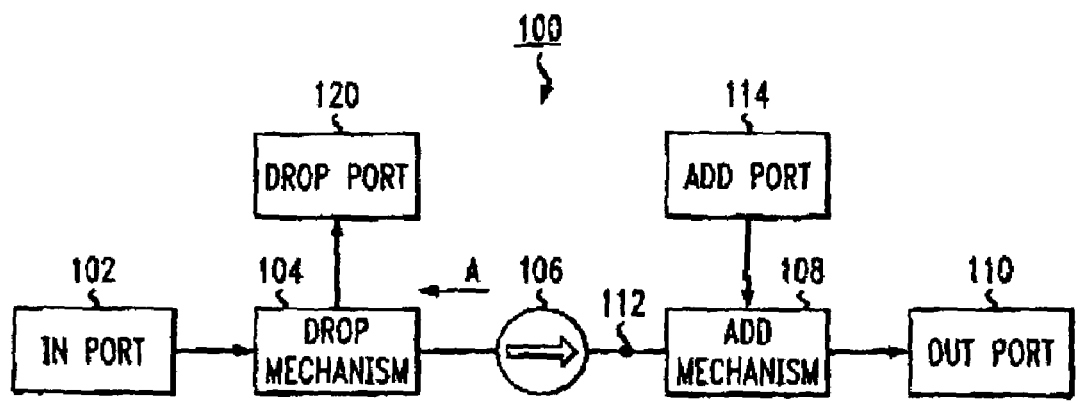
FIG. 1 depicts an example optical ADD/DROP multiplexer according to the prior art.
Figure 2:
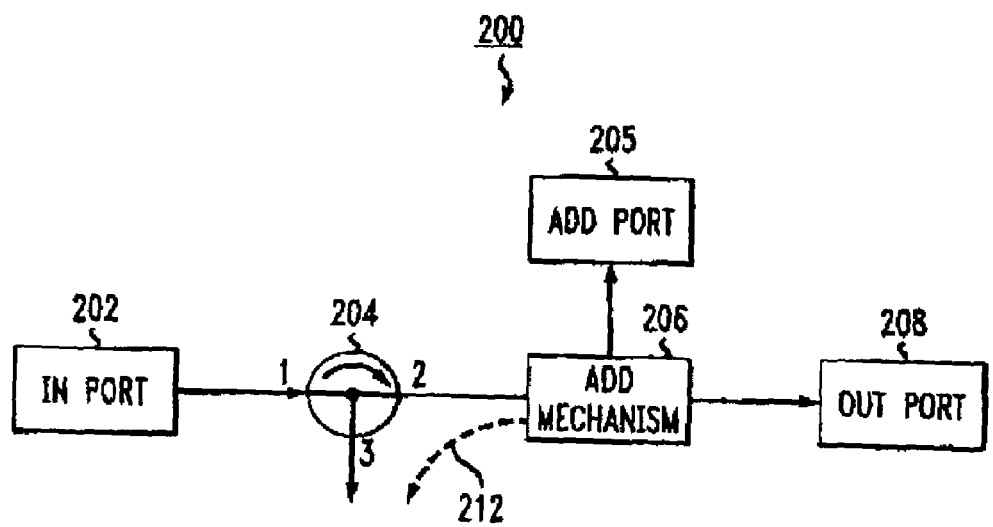
FIG. 2 is a schematic view of an optical ADD multiplexer according to one embodiment of the present invention.

FIG. 2 depicts a schematic representation of an ADD multiplexer 200 of an embodiment of the present invention. ADD multiplexer 200 includes an input port 202, an optical circulator 204 (having ports 1, 2, and 3), an ADD mechanism 206 having ADD port 205, and an output port 208.

Input port 202 and output port 208 represent any optical input mechanism, such as, for example, optical fiber. Circulator 204 represents any device that operates in the following manner: light input at port 1 is output at port 2; and light input at port 2 is output at port 3, and is not output at port 1. Add mechanism 206 represents any configuration of optical devices that allow for adding a wavelength or wavelengths to an optical transmission system.

In operation, optical signals enter through input port 202. These optical signals include signals of one or more different wavelengths traveling along the same optical transmission path. These optical signals enter the first port of optical circulator 204 and exit the second port of optical circulator 204 before entering ADD mechanism 206. Additional wavelength(s) are added to the optical signals received by ADD mechanism 206 via ADD port 205. These optical signals (including the added wavelengths) then pass through the output port 208 of optical ADD multiplexer 200. As configured, these added signals are intended to travel in the direction of output path 208. However, a fraction of the optical power introduced by ADD mechanism 206 might not be directed along the desired path. In this case, the errant optical power will propagate along the route shown in reverse path 212. The errant signals enter the second port of optical circulator 204 and exit via the third port of optical circulator 204. These signals then can be detected. They can be used to either create an error signal, monitor the ADD operation, or to tune any tunable optical devices included in ADD mechanism 206. This detection is illustrated in FIG. 3.

Figure 3A:
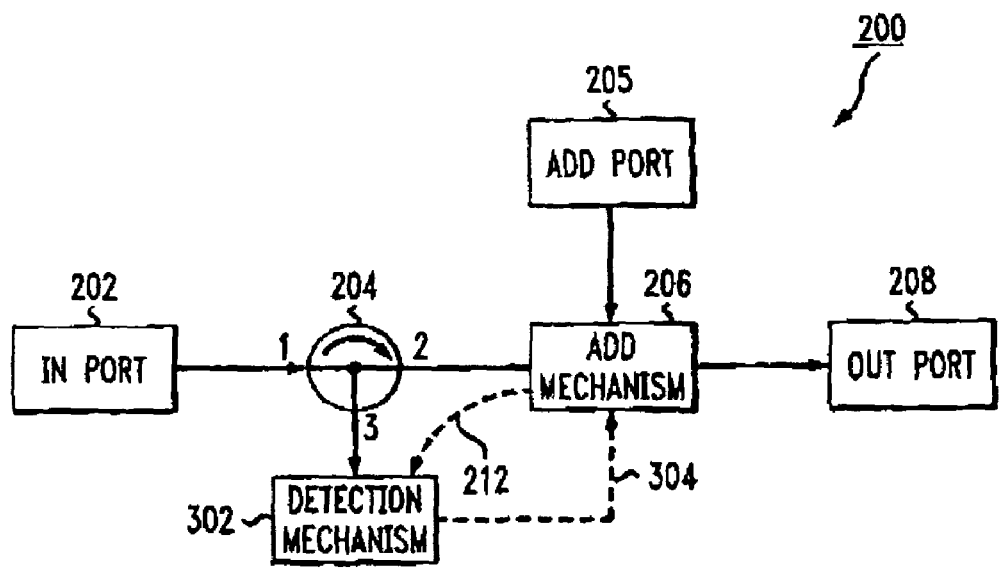
FIG. 3a is a schematic representation of the optical ADD multiplexer of the present invention including a detection mechanism and a feedback path.

FIG. 3a depicts a schematic representation of ADD multiplexer 200 of FIG. 2, with a detection mechanism 302 and a feedback path 304 according to an example embodiment of the present invention. Detection mechanism 302 is coupled to port three of optical circulator 204 and represents any device or configuration of devices that may be used to detect light propagation. Feedback path 304 represents any signal transport medium carrying an error signal derived from the detection mechanism 302.

In this configuration, any portion of an optical signal added by ADD mechanism 206 that couples in the direction shown by reverse path 212 and exiting at port 3 of circulator 204 may be detected by detection mechanism 302. As described above, this information may be used for a number of purposes, including error detection or as a monitoring system to monitor the efficiency of the ADD operation. Additionally, according to another embodiment of the present invention, feedback path 304 may be coupled between detection mechanism 302 and ADD mechanism 206 as shown. In this configuration, for example, ADD mechanism 206 may be tunable and would use the signal traveling along path 304 to monitor its operation and/or adjust the wavelength(s) it adds accordingly. Alternatively, ADD mechanism 206 may contain a variable attenuator or gain and would use the signal traveling along path 304 to adjust the power transmitted to output port 208.

Figure 3B:
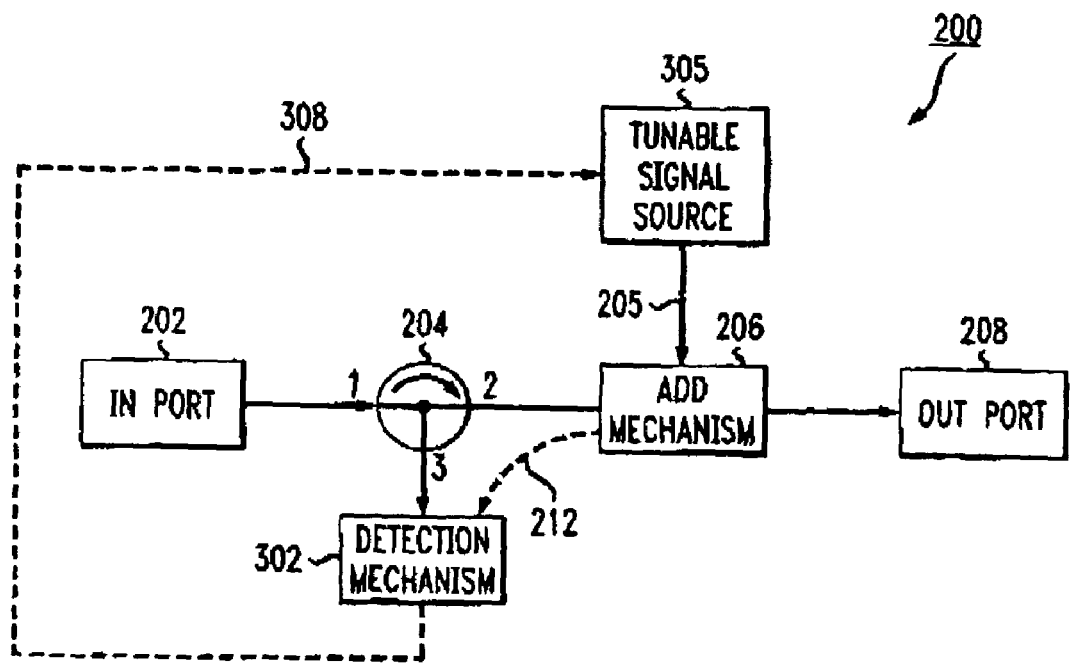

FIG. 3b depicts a schematic representation of ADD multiplexer 200 of FIG. 2 according to another example embodiment of the present invention, which shows a detection mechanism 302 and a feedback path 308, as well as a tunable signal source 305. Tunable signal source 305 is coupled to the ADD port 205 of ADD mechanism 206. Detection mechanism 302 is coupled to port three of optical circulator 204. Feedback path 308 represents any signal transport medium carrying an error signal derived from the detection mechanism 302. For example, the detection mechanism can measure the wavelength of the propagating signal, compare it to a desired wavelength, and create an error signal which is fed back to the tunable signal source. The wavelength output of tunable signal source 305 can then be adjusted to match the desired wavelength. In this embodiment, it is desirable that a small fraction of the added signal be transmitted along path 212, to provide an error signal.

Rather than measure the wavelength of the light transmitted along path 212, detection mechanism 302 can measure the optical power. In many add mechanisms, the light traversing path 212 will be minimized when the wavelength of tunable source 305 matches the wavelength that ADD mechanism 206 was designed to add. By adjusting the wavelength of tunable source 305, the amount of light transmitted along path 212 is minimized. If multiple wavelengths are being added, then the light transmitted along path 212 will be minimized when the wavelengths of all the tunable sources are properly adjusted. The accuracy and speed of feedback path 308 will be improved if a different amplitude or wavelength dither is placed on each tunable source, so that separate error signals can be derived.

Figure 3C:
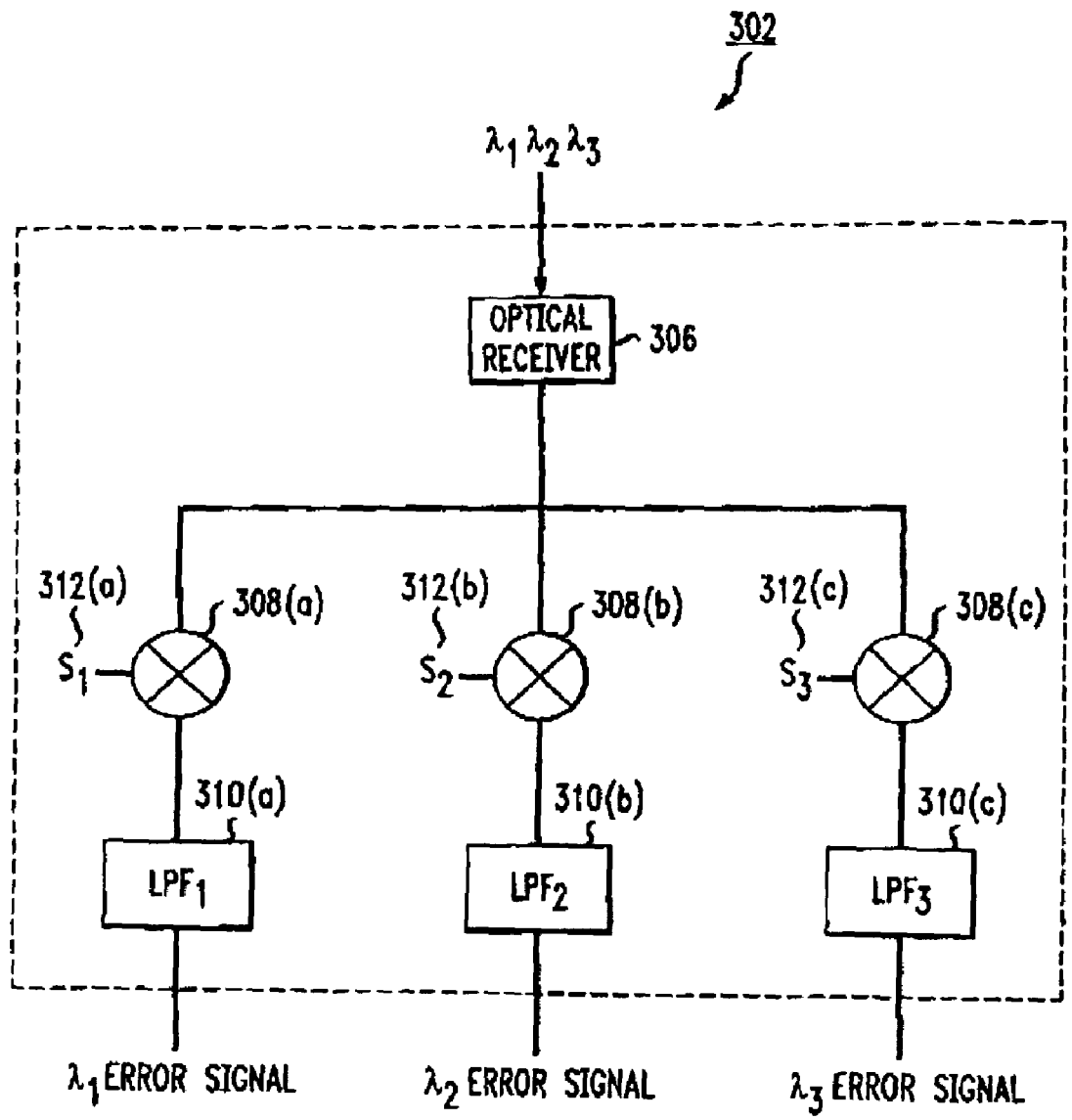
FIG. 3c is a schematic representation of an example embodiment of a detection mechanism according to the present invention.

A detailed view of one possible detection mechanism is shown in FIG. 3c. This detection mechanism is especially advantageous when multiple wavelengths are to be used, so FIG. 3c depicts the case when three wavelengths ($\lambda 1$, $\lambda 2$, $\lambda 3$) are being added, each modulated with a different data signal $S_1$, $S_2$, $S_3$ (shown as 312(a–c)). As previously mentioned, the control loop's accuracy and speed can be improved if a separate error signal can be derived for each added wavelength; this is true, for example, when either the sources or the add mechanism is tunable. Rather than dithering each signal, the data modulating the signal can be used to differentiate between signals at different wavelengths. The received light at port 3 of circulator 204 (as shown in FIG. 3b) can be converted to an electronic signal using an optical receiver 306 in this example embodiment and be electronically mixed (using mixers 308(a–c)) with the data which is modulating each optical signal source. The mixer outputs can then be passed through low-pass filters 310(a–c), the output of filters 310(a–c), will be proportional to the correlation between the signal transmitted along path 212 (as shown in FIG. 3b) and the output of each optical signal source 305. Thus, the output of a mixer for a particular wavelength will be the error signal corresponding to the signal at that wavelength.

Figure 4:
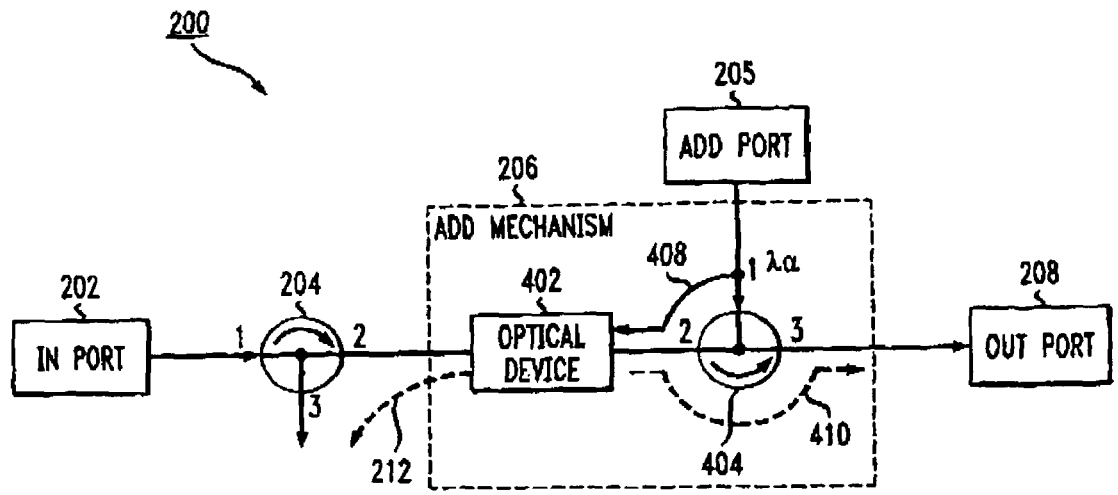
FIG. 4 is a schematic representation of the optical ADD multiplexer of FIG. 2 in more detail.

FIG. 4 depicts a schematic representation of ADD multiplexer 200 of FIG. 2 showing ADD mechanism 206 in greater detail. In one embodiment of the present invention, ADD mechanism 206 includes an optical device 402, an optical circulator 404 (having ports 1, 2, and 3), and an ADD port 205. Optical device 402 is coupled to port 2 of optical circulator 204 and to port 2 of optical circulator 404. Optical device 402 is any optical device that acts as a wavelength selective mirror. For example, optical device 402 can comprise of one or more fiber Bragg gratings. Optical device 402 can be tunable in that it can be either selectable and/or continuously tunable. Optical circulator 404 may include any device which operates in the following manner: light input at port 1 is output at port 2; and light input at port 2 is output at port 3 and is not output at port 1. ADD mechanism 206 may be tunable—e.g., fiber Bragg gratings can be tuned by stretching the fiber in which the grating is written.

In this configuration, light of a particular wavelength ($\lambda\alpha$) enters ADD mechanism 206 through ADD port 205, which is coupled to port 1 of optical circulator 404 and propagates in the direction indicated by arrow 408. Tunable optical device 402 then reflects light of wavelength $\lambda\alpha$, which is then combined with the signals at other wavelengths received from port 2 of circulator 204 and passing through tunable optical device 402. The light then passes via port 3 of optical circulator 404 along path 410 to output port 208. In one example embodiment, when tunable optical device 402 is properly tuned, little to no light from ADD port 205 should exit port 3 of optical circulator 204. Thus, the light output by port 3 of circulator 204 can be used, for example, as an error signal, to determine the efficiency of the ADD operation, or to control the tuning of tunable optical device 402. Also, as described in FIGS. 3a and 3b, a detection mechanism or a feedback loop may be coupled to port 3 of optical circulator 204 to detect, monitor, and/or provide this detected information to tunable optical device 402 such that an adjustment may be made.

This detection may also be done, in an example embodiment of the present invention, with multiple added wavelengths (using multiple tunable optical devices located between port 2 of optical circulator 204 and port 2 of optical circulator 404). In this configuration the detection may be done by using the differences between the signals being transmitted on each wavelength to provide separate error signals to each tunable optical device, as shown in FIG. 3c. Also, in another example embodiment of the present invention, optical circulator 204 and tunable optical device 402 are remotely located from one another. In this case, the detection may be used to monitor the signals added at ADD port 205 by either intentionally misaligning the added wavelength and tunable optical device 402, or by using a wavelength selective mirror that transmits a small fraction of the power at all wavelengths, even at the transmission minimum, so that a fraction of the power of the added signals may be sent from ADD port 205 to port 3 of optical circulator 204 for detection or monitoring of the remotely located ADD mechanism.

Figure 5:
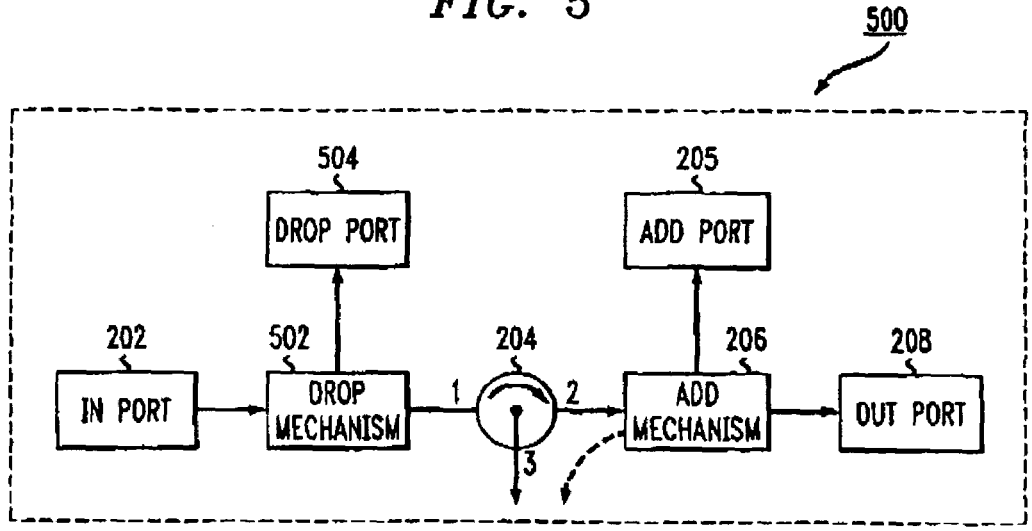
FIG. 5 is a schematic representation of an example embodiment of an optical ADD/DROP multiplexer of the present invention.

The configuration of ADD multiplexer 200 described above can be used in many ways. FIG. 5 depicts one such use in which the ADD mulitplexer described above is combined with a DROP mechanism 502 to create ADD/DROP multiplexer 500. ADD/DROP multiplexer 500 includes a DROP mechanism 502 disposed between input port 202 and port 1 of optical circulator 204. DROP mechanism 502 represents any configuration of optical devices that allow for dropping a wavelength or wavelengths from an optical transmission system (not shown).

In operation, optical signals, which could be of differing wavelengths, enter ADD/DROP multiplexer 500 at input port 202. DROP mechanism 502 then drops, i.e., removes, wavelengths from the transmission channel. The remaining wavelengths enter port 1 of optical circulator 204 and exit at port 2 of optical circulator 204 before entering ADD mechanism 206. As described above, ADD mechanism 206 adds optical signals, i.e., adds wavelengths, to the optical transmission system. These optical signals, including the added wavelength(s) and without the dropped wavelength(s), exit ADD/DROP multiplexer 500 at output port 208. Optical circulator 204 provides isolation between DROP mechanism 502 and ADD mechanism 206 to prevent cross-talk between the two devices. It also, as described above, provides an error signal should any portion of light having an added wavelength propagate in reverse direction indicated by reverse path 212. Any signals traveling along this path may be used in a manner described above in connection with the discussion of ADD multiplexer 200.

Figure 6:
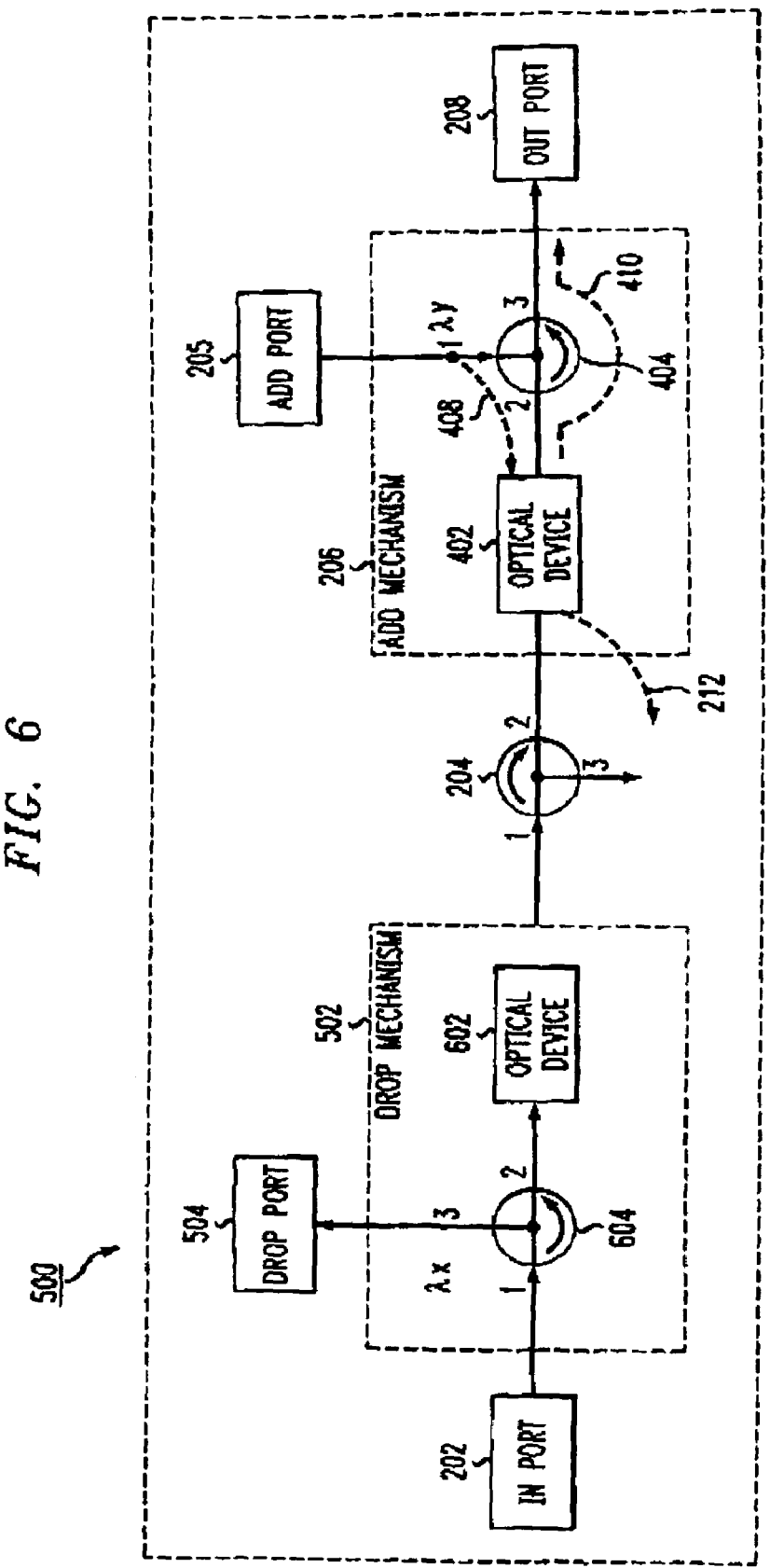
FIG. 6 is a schematic representation of the optical ADD/DROP multiplexer of FIG. 5 in more detail.

FIG. 6 is a schematic representation of a more detailed view of ADD/DROP multiplexer 500. The description of components of ADD mechanism 206 is similar to that in connection with FIG. 4. DROP mechanism 502 includes optical circulator 604 (having ports 1, 2, and 3), DROP port 504, and tunable optical device 602. Tunable optical device 602 is any optical device that can be tuned to allow only certain light wavelengths to pass through it. Tunable optical device 602 may include tunable filters such as a fiber Bragg grating. Circulator 604 represents any device that operates in the following manner: light input at port 1 is output at port 2; and light input at port 2 is output at port 3 and is not output at port 1. DROP port 504 includes any device or transport medium for adding wavelengths to an optical transmission channel. Port one of optical circulator 604 is coupled to input port 202, and port 2 of optical circulator 604 is coupled to tunable optical device 602.

In operation, light of varying wavelengths enters ADD/DROP multiplexer 500 through input port 202 before entering port 1 of optical circulator 604. Tunable optical device 602 then reflects light of a particular wavelength ($\lambda$x) while allowing light at other wavelengths to pass through it. Light at wavelength $\lambda$x is reflected back to port 2 of circulator 604 and exits via port 3 of optical circulator 604 and continues out through DROP port 504. The remaining light passes through device 602, enters port 1 of optical circulator 204 and exits via port 2 of optical circulator 204. Optical circulator 204 provides isolation between DROP mechanism 502 and ADD mechanism 206, thus preventing cross-talk. Light then enters tunable optical device 402 and passes through to port 2 of optical circulator 404. Light at wavelength $\lambda$y is added at ADD port 205 to the optical transmission system via port 1 of optical circulator 404. Light at wavelength $\lambda$y is reflected by tunable optical device 402 and combined with light at other wavelengths passing through tunable optical device 402 exiting via port 3 of optical circulator 404 and then exits via output port 208. Note that any light with wavelength $\lambda$y transmitted into add mechanism 206 from port 2 of circulator 204 will also be reflected from tunable optical device 402 and follow path 212. This prevents this light from interfering with the added signal. This reflected light can also be used to monitor the wavelength of tunable filter 402.

When tunable optical device 402 is properly tuned, little or no light from ADD port 205 should exit port 3 of optical circulator 204. Should light travel in the direction indicated by reverse path 212, this light may be used, for example, as an error signal or to monitor the operation of the system as described above. Those of skill in the art will recognize that the wavelengths added and dropped may be of different wavelengths or of the same wavelength. Also, those of skill in the art will recognize that multiple wavelengths may be added and dropped rather than a single wavelength being added or dropped at a time.

Note that optical devices 402 and 602 can also be described as wavelength selective mirrors. Light at wavelengths in the passband is transmitted through the filter, while light at other wavelengths is largely reflected. At wavelengths bordering the passband, a fraction of the light will be transmitted through the filter and a fraction will be reflected.

Figure 7:
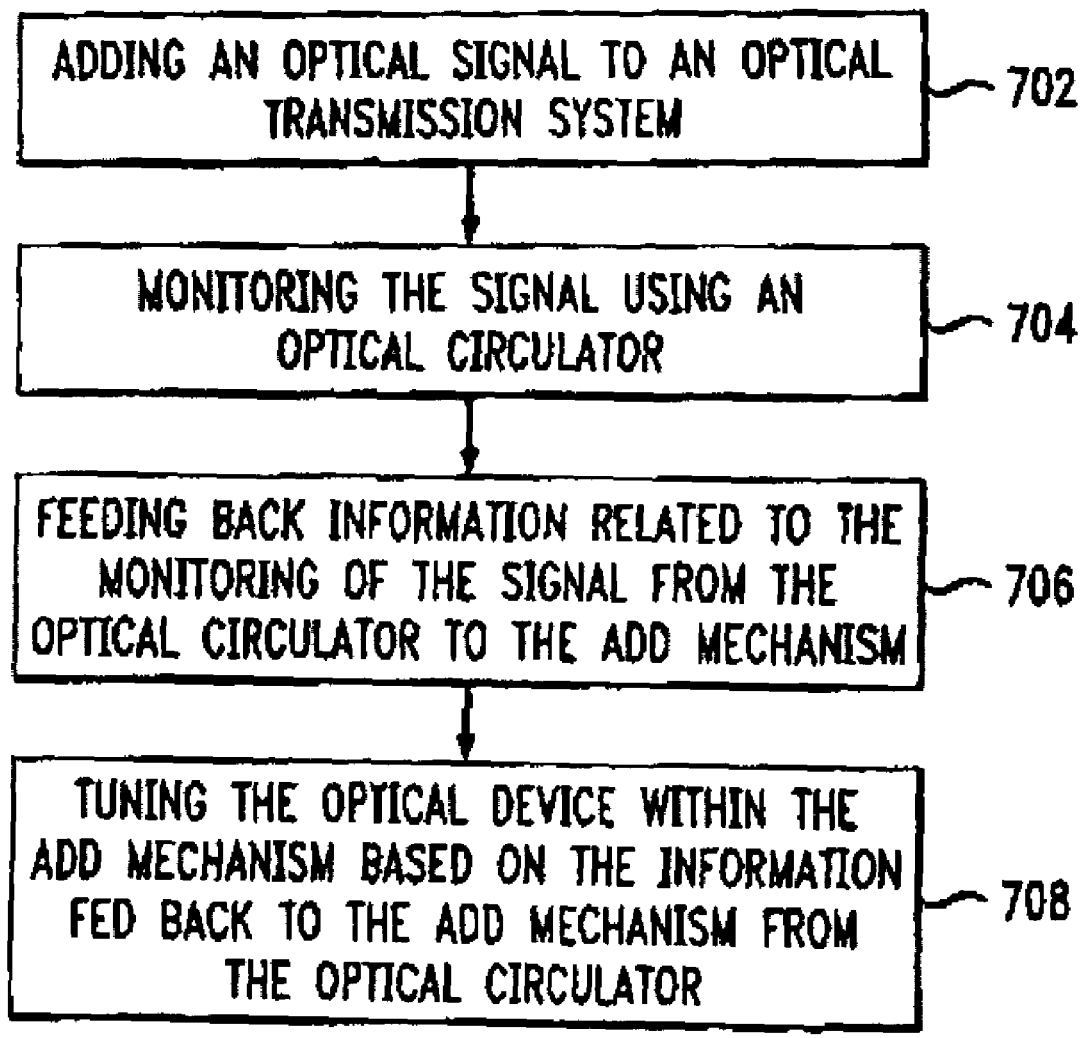
FIG. 7 is a flowchart that describes a method according to an example embodiment of the present invention for the operation of the optical ADD multiplexer of the present invention.

FIG. 7 is a flowchart illustrating the operation of an example embodiment of the present invention. An optical signal is added to the optical transmission system, shown in step 702, then light propagation is detected by an optical circulator, as shown in step 704. This detecting step may be used to detect an indication of the efficiency of the wavelength ADD operation and/or to detect loss components of the ADD operation. This information is fed back to the ADD mechanism as shown in step 706. This information can then be uses to tune any tunable optical devices present in any ADD mechanism used by the system as shown in step 708.

Figure 8:
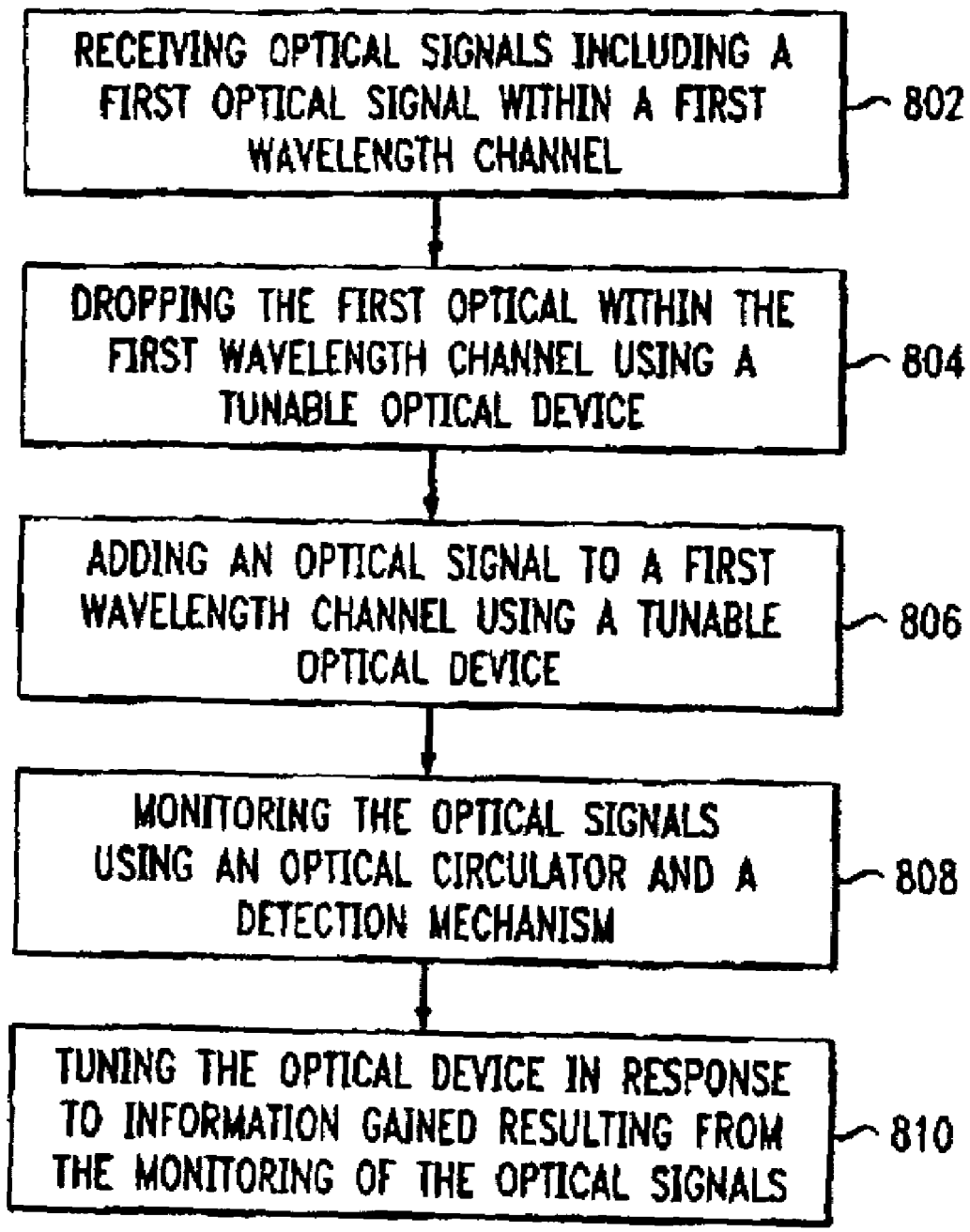
FIG. 8 is a flowchart that describes a method according to an example embodiment of the present invention for tuning a tunable optical device in an optical ADD multiplexer of the present invention.

FIG. 8 is a flowchart illustrating the operation of another example embodiment of the present invention. As shown in step 802, optical signals are received. After dropping an optical signal shown in Step 804, an optical signal is added to an optical transmission system, shown in step 806, then an optical circulator is used monitor the added signal, shown in step 808. The data collected from the detecting step is used, as shown in step 810, to tune a tunable optical device which may be used in the ADD mechanism structure. Those of skill in the art will recognize that this tunable optical device may be a tunable filter (such as a fiber Bragg grating) or a tunable laser.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An add multiplexer comprising:

an input port;

an optical circulator comprising a first port, a second port, and a third port, said first port of said optical circulator coupled to said input port;

an optical monitor mechanism coupled to said third port of said optical circulator;

a wavelength add mechanism having an input port X that is connected to said second port of said optical circulator, an input port Y and an output port Z, which wavelength add mechanism is adapted to direct substantially all of a signal's optical power that is applied to input port Y flowing out of its output port Z, leaving an errant signal fraction of said optical power flowing out of said input port Y;

a tunable signal source interposed between said input port Y and said optical monitor mechanism thereby providing a feedback path that allows said errant signal fraction of said optical power flowing out of said input port X to influence the signal is applied to input port Y; and an output port coupled to said output port Z.

2. An add multiplexer of claim 1 wherein said optical monitor measures the optical power at said third port of said optical circulator.

3. An add multiplexer of claim 1 wherein said optical monitor measures the wavelength of the light at said third port of said optical circulator.

4. An add multiplexer of claim 1 wherein said optical monitor measures optical power versus wavelength.

5. The add multiplexer of claim 1 wherein a drop mechanism is coupled in between said input port and said first port of said optical circulator.

* * * * *